US 6,532,046 B1

(12) United States Patent
Yamashita et al.

(10) Patent No.: US 6,532,046 B1
(45) Date of Patent: Mar. 11, 2003

(54) LIQUID CRYSTAL DISPLAY MATERIAL, LIQUID CRYSTAL DISPLAY METHOD AND LIQUID CRYSTAL DISPLAY DEVICE

(75) Inventors: Yuji Yamashita, Kitasoma-gun (JP); Keiko Kurata, Mitsukaido (JP); Kouji Ooae, Kure (JP); Ryuzo Fukao, Kitasoma-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 44 days.

(21) Appl. No.: 09/695,292

(22) Filed: Oct. 25, 2000

(30) Foreign Application Priority Data

Oct. 25, 1999 (JP) .............................. 11-301892
Dec. 22, 1999 (JP) .......................... 11-364840

(51) Int. Cl.$^7$ .............................................. G02F 1/137
(52) U.S. Cl. ........................ 349/86; 349/168; 349/20
(58) Field of Search ................. 219/497, 209; 347/172; 349/183, 124, 161, 86, 20; 252/299

(56) References Cited

U.S. PATENT DOCUMENTS

| 5,066,107 A | * 11/1991 | Yoshinaga et al. ........... 349/172 |
| 5,548,420 A | * 8/1996 | Koshimizu et al. ........... 349/168 |
| 5,583,676 A | * 12/1996 | Akiyama et al. ............. 349/110 |
| 5,767,489 A | * 6/1998 | Ferrier ....................... 219/209 |
| 5,844,643 A | * 12/1998 | Onishi et al. ................ 349/156 |
| 6,184,954 B1 | * 2/2001 | Inoue et al. ................. 349/153 |

FOREIGN PATENT DOCUMENTS

| JP | 06018831 | 1/1994 | |
| JP | 406194629 A | * 7/1994 | .................. 430/20 |
| JP | 07246781 | 9/1995 | |
| JP | 10062739 | 3/1998 | |

* cited by examiner

Primary Examiner—William L. Sikes
Assistant Examiner—P. R. Akkapeddi
(74) Attorney, Agent, or Firm—Birch, Stewart, Kolasch & Birch, LLP

(57) ABSTRACT

The object of the present invention is to provide a novel liquid crystal display material having an excellent contrast ratio, a display method and a display device using the material. The present invention uses a liquid crystal display material comprising a polymer in which a liquid crystal is dispersed in a dissolvable state or a phase separable state, wherein the liquid crystal dissolves in the polymer at high temperatures and separates from the polymer at low temperatures, and a contrast ratio (B/A) of a reflectance (A) of the display material cooled from the dissolution state at a rate of 10° C./sec and a reflectance (B) of the display material cooled from the dissolution state at a rate of 4° C./sec is not less than 2. The image forming state can be maintained by controlling the cooling rate from the dissolution state to maintain the liquid crystal in translucent state.

9 Claims, 3 Drawing Sheets

UNHEATED STATE (NEMATIC)
CLOUDY (OPAQUE)

HEATED STATE (ISOSTROPIC)
TRANSPARENT

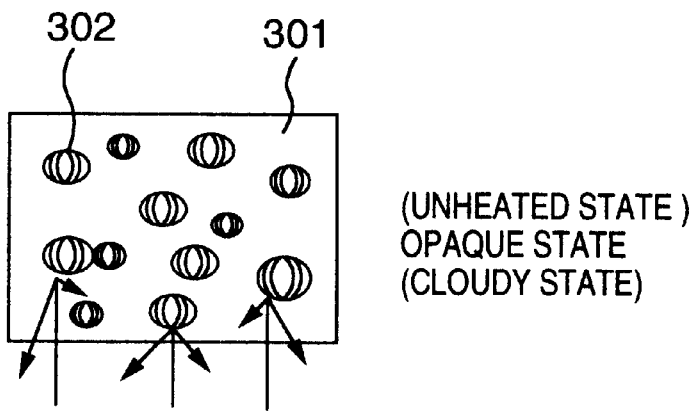
FIG. 3A (UNHEATED STATE) OPAQUE STATE (CLOUDY STATE)
HEATING ⇓  ⇑ COOLING BY LEAVING
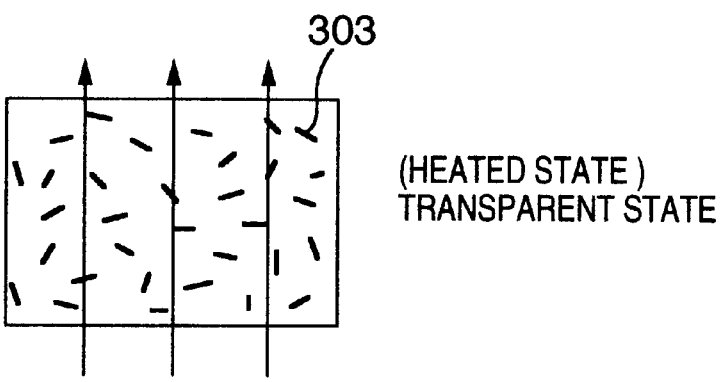
FIG. 3B (HEATED STATE) TRANSPARENT STATE
WITH TEMPERATURE CONTROLLING ⇓  ⇑ HEATING
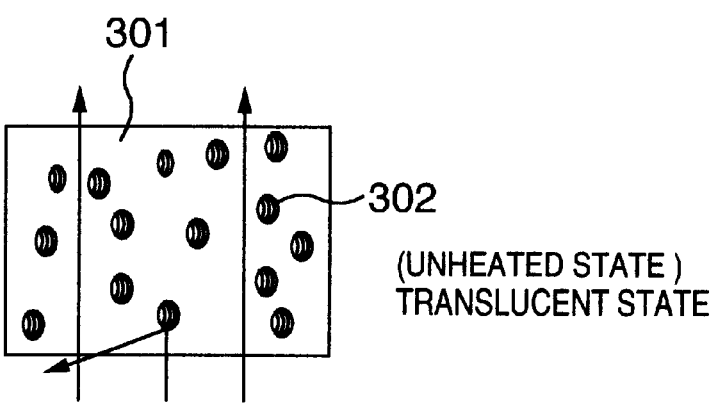
FIG. 3C (UNHEATED STATE) TRANSLUCENT STATE Tg : GLASS TRANSITION POINT OF POLYMER RESIN
TNI : PHASE-TRANSITION TEMPERATURE OF NEMATIC PHASE-ISOTROPIC PHASE
Ttr : CLOUDY STATE-TRANSPARENT STATE CHANGING TEMPERATURE AS POLYMER DISPERSION TYPE LIQUID CRYSTAL FILM

LIQUID CRYSTAL DISPLAY MATERIAL, LIQUID CRYSTAL DISPLAY METHOD AND LIQUID CRYSTAL DISPLAY DEVICE

BACKGROUND OF THE INVENTION

The present invention relates to a liquid crystal display material, a liquid crystal display method, and a liquid crystal display device. More particularly, the present invention relates to a liquid crystal display material comprising a polymer in which a liquid crystal is dispersed in dissolvable state or phase-separable state, a liquid display method utilizing thermal phase separation in which the image forming state can be maintained by keeping the liquid crystal in translucent state by controlling the cooling rate, and a liquid crystal device using the liquid crystal display material.

Development of liquid crystal display devices using polymer dispersion type liquid crystals has been in progress. The polymer dispersion type liquid crystals are superior in properties such as luminosity, contrast and angle of visual field to liquid crystal display devices utilizing polarized light. Furthermore, due to the structure of the liquid crystal being dispersed in a polymer, the liquid crystal is not needed to be sealed and it is easy to make larger the area of the devices.

Such conventional polymer dispersion type liquid crystal displays utilize changing of optical properties of the liquid crystals due to response to electric field or response to heat. For example, JP-A-3-52843 discloses a liquid crystal optical device using the polymer dispersion type liquid crystal with utilization of electric field response. In this device, ordinary light refractive index of the liquid crystal and that of the polymer are close to each other, and thus an electric field is applied to the liquid crystal to arrange the orientation of liquid crystal molecules in the direction of application of the voltage, thereby to make the device transparent, and during application of no electric field, the liquid crystal molecules align along the interface of polymer/liquid crystal, and, hence, light is scattered at the interface due to the difference in refractive index of the polymer and the liquid crystal, thereby to result in cloudy state.

However, in the case of this device, if thickness of the polymer dispersion type liquid crystal layer is increased so as to increase cloudiness with no electric field being applied, the driving voltage simultaneously rises. Moreover, even during an electric field being applied, since fine liquid crystal droplets cannot respond to the electric field, or since it is difficult to make the ordinary light refractive index of the liquid crystal close to that of the polymer, a complete transparent state can hardly be obtained. That is, for attaining a display having excellent contrast with low voltage driving, there is an electro-optical limit.

Furthermore, Display Material Investigative Report II (edited by a corporation Japan Electronic Industry Promotion Association and published in March, 1991; Items 85–97) discloses a liquid crystal device utilizing a heat responsive polymer dispersion type liquid crystal. This liquid crystal device uses a polymer dispersion type liquid crystal comprising a polymer in which a nematic liquid crystal is dispersed. FIG. 1A shows an unheated state (nematic phase) of the above polymer dispersion type liquid crystal, and FIG. 1B shows a change in mode of the polymer dispersion type liquid crystal in heated state (isotropic phase). FIG. 2 shows the relation between temperature and refractive index of the polymer dispersion type liquid crystal.

As shown in FIG. 1A and FIG. 2, the polymer dispersion type liquid crystal is in cloudy or opaque state in unheated state. This is because light is scattered at the interface of polymer/liquid crystal as in the above-mentioned liquid crystal display devices using the electric field driving polymer dispersion type liquid crystals.

On the other hand, as shown in FIG. 1B and FIG. 2, when this polymer dispersion type liquid crystal is heated and just after the temperature exceeds a certain point (nematic-isotropic phase transition point: $T_{NI}$), the polymer dispersion type liquid crystal changes from cloudy state to transparent state. This is because the liquid crystal in the polymer dispersion type liquid crystal is heated to higher than the nematic-isotropic phase transition point to lose liquid crystallinity and to cause decrease of difference between the refractive index of the isotropic phase and the refractive index np of the polymer. In this case, heat conduction uniformly occurs without depending on the particle diameter of the liquid crystal droplets and, hence, display driving property is satisfactory, but since it is also difficult to completely make the refractive index of the isotropic phase close to that of the polymer, contrast is not sufficient.

Moreover, "Liquid Crystal Display Technique" (edited by Industrial Investigation Association and published on Sep. 20, 1994; Items 53–57) and others report thermal writing devices using both the electric field and the heat. For example, JP-A-6-18831 discloses a display device fabricated by sandwiching a layer comprising a nematic liquid crystal dispersed in a polymer between a transparent electrode and a substrate provided with a heating wiring. In this device, orientation of the liquid crystal in the direction of electric field is fixed to maintain the transparent state by using heat and electric field in combination. In this case, too, for performing a display excellent in contrast by low voltage driving, there is an electro-optical limit, and, besides, the transparent state cannot keep a high transmission over a long period of time.

SUMMARY OF THE INVENTION

Thus, an object of the present invention is to provide a novel liquid crystal display material having an excellent contrast ratio.

Another object of the present invention is to provide a polymer dispersion type liquid crystal display method and device which are capable of thermal writing/thermal erasing by maintaining a translucent state.

The above first object can be attained by a liquid crystal display material comprising a polymer in which a liquid crystal is dispersed in dissolvable or phase separable state, wherein the liquid crystal dissolves in the polymer at high temperatures and separates from the polymer at low temperatures, and a contrast ratio (B/A) of a reflectance (A) of the display material cooled from the dissolution state at a rate of 10° C./sec and a reflectance (B) of the display material cooled from the dissolution state at a rate of 4° C./sec is not less than 2.

The above second object of the present invention is attained by a polymer dispersion type liquid crystal display where a display medium having a material composition according to which the liquid crystal disperses in the polymer in unheated state and the liquid crystal dissolves in the polymer in heated state is used and the cooling rate from the dissolution state is adjusted to control the particle diameter of liquid crystal droplets, thereby maintaining the image forming state.

BRIEF DESCRIPTION OF THE DRAWINGS

FIG. 1A shows the unheated state and FIG. 1B shows the heated state.

FIGS. 3A, 3B and 3C schematically show the liquid crystal display system utilizing thermal phase separation according to the present invention, and FIG. 3A shows the unheated state (cloudy and opaque state), FIG. 3B shows the heated state (transparent state) and FIG. 3C shows the translucent state formed when rapid cooling is carried out from the heated state to the unheated state with controlling the temperature.

DESCRIPTION OF REFERENCE NUMERALS

Figure 1A:
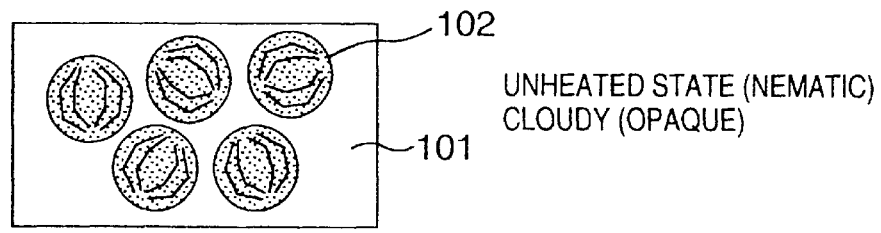
FIG. 1A and FIG. 1B schematically show the change of state of the polymer dispersion type liquid crystal layer in unheated state and heated state.

101: Polymer resin.
102: Liquid crystal droplets of nematic phase.
103: Liquid crystal droplets of isotropic phase.
301: Polymer resin.
302: Microfine liquid crystal droplets of nematic phase.
303: Liquid crystal molecules which dissolve in the polymer by heating.
400: Liquid crystal display device.
401: Substrate.
402: Polymer dispersion type liquid crystal layer.
403: Background layer.
404: Heating element.
405: Temperature controlling device.
406: Current supplying device.
407: Temperature sensor.
408: Controller.

DETAILED DESCRIPTION OF THE INVENTION

The terms used in this specification have the following meanings. The term "phase transition temperature $T_{NI}$" means the phase transition temperature of nematic phase-isotropic phase. As the liquid crystals, there may be used not only nematic liquid crystals, but also smectic liquid crystals and cholesteric liquid crystals. In this case, the phase transition temperature $T_{NI}$ means a phase transition temperature of liquid crystal phase-isotropic phase. The term "polymer dispersion type liquid crystal" is a composite film of a polymer and a low-molecular liquid crystal, and a polymer network type comprising a polymer matrix in which liquid crystal droplets form a continuum and a microcapsule type comprising a liquid crystal microencapsulated with a polymer can also be regarded as one of composite systems of a polymer and a low-molecular liquid crystal.

FIGS. 3A, 3B and 3C show the principle of a polymer dispersion type liquid crystal display in thermal driving display. In FIG. 3A, nematic liquid crystal droplets 302 disperse in the polymer in unheated state to cause scattering of light at the interface of polymer/liquid crystal due to the difference in refractive index, and, hence, the display is in opaque and cloudy state. In case the liquid crystal droplets of small diameter are dispersed, the display is in highly cloudy state, namely, more opaque state. When the polymer dispersion type liquid crystal layer is heated from the state of FIG. 3A to higher than $T_g$ or $T_{NI}$, liquid crystal molecules 303 dissolve in the polymer to result in the completely transparent state as shown in FIG. 3B. When the layer is rapidly cooled from the dissolution state of FIG. 3B with controlling the temperature, the liquid crystal droplets of very small diameter are dispersed as shown in FIG. 3C, and thus the translucent state is maintained. This is because if the particle diameter of the liquid crystal droplets is much smaller than the wavelength of light, scattering of light decreases remarkably. Further, once the translucent state is formed, the translucent state is maintained at room temperature, whereby consumption of electric power can be saved and very economical liquid crystal display devices of low running cost can be obtained.

When the layer in the translucent state shown in FIG. 3C is heated again, the layer is returned to the dissolution state shown in FIG. 3B, and when heating is stopped in this state and natural cooling is carried out, the layer is returned to the opaque state (cloudy state) of FIG. 3A. Therefore, for returning the layer to the opaque state from the translucent state, this must be performed through the dissolution state shown in FIG. 3B.

For converting the transparent state of FIG. 3B to the translucent state of FIG. 3C, it is necessary to lower the temperature of the polymer dispersion type liquid crystal at a rate of not lower than 5° C./sec. For example, cooling at 10° C. reduces the diameter of the liquid crystal droplets to less than 1 μm. If the size of the liquid crystal droplets is more than 1 μm, light scattering increases and transparency decreases, and contrast in the display also decreases. Since the average particle diameter of the liquid crystal droplets in the opaque (cloudy) state is generally in the range of about 1–10 μm, the size of the liquid crystal droplets is reduced to about 1/10 of that diameter in the cooled state in the present invention.

Figure 4:
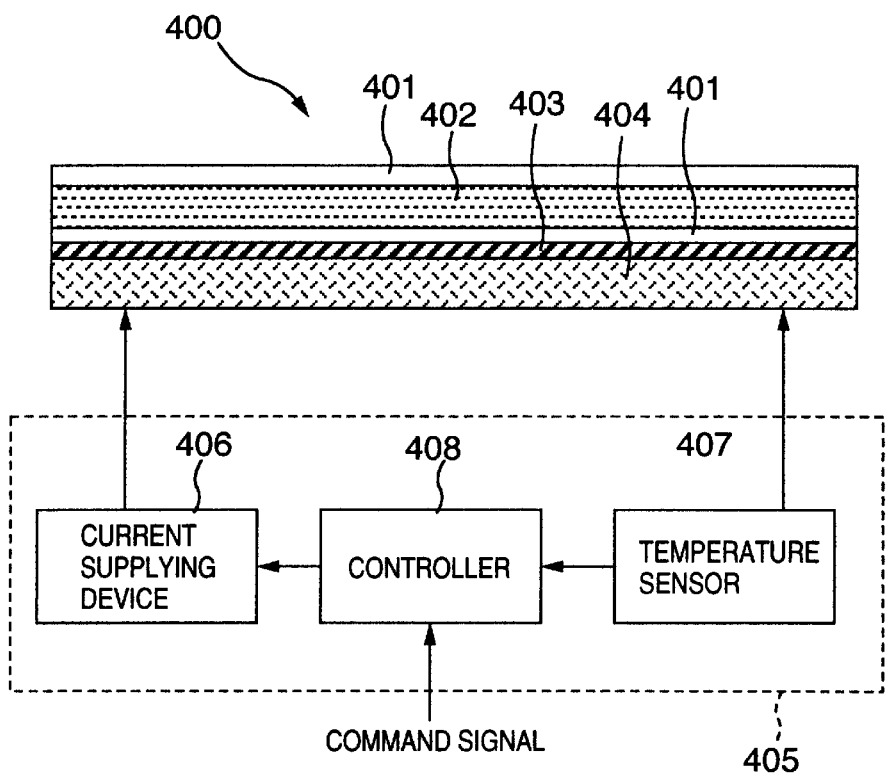
FIG. 4 is a schematic sectional view of one example of the liquid crystal display device according to the present invention.

The liquid crystal display device of the present invention will be explained in more detail referring to the drawings. FIG. 4 is a schematic oblique sectional view of one example of a liquid crystal display device 400 according to the present invention. As shown therein, the liquid crystal display device 400 of the present invention is basically comprised of a substrate 401, a polymer dispersion type liquid crystal layer 402, a background layer 403, and a heating element 404. The liquid crystal display material of the present invention is used as a material for forming the polymer dispersion type liquid crystal layer 402.

First, in the polymer dispersion type liquid crystal layer 402 of the present invention, a polymer whose glass transition temperature ($T_g$) is close to the phase transition temperature ($T_{NI}$) (nematic phase-isotropic phase) of the liquid crystal is used as a binder resin. It is preferred to satisfy the condition of $-20° C. \leq (T_g - T_{NI}) \leq 20° C$. More preferable range is $0° C. \leq (T_g - T_{NI}) \leq 10° C$.

Figure 5:
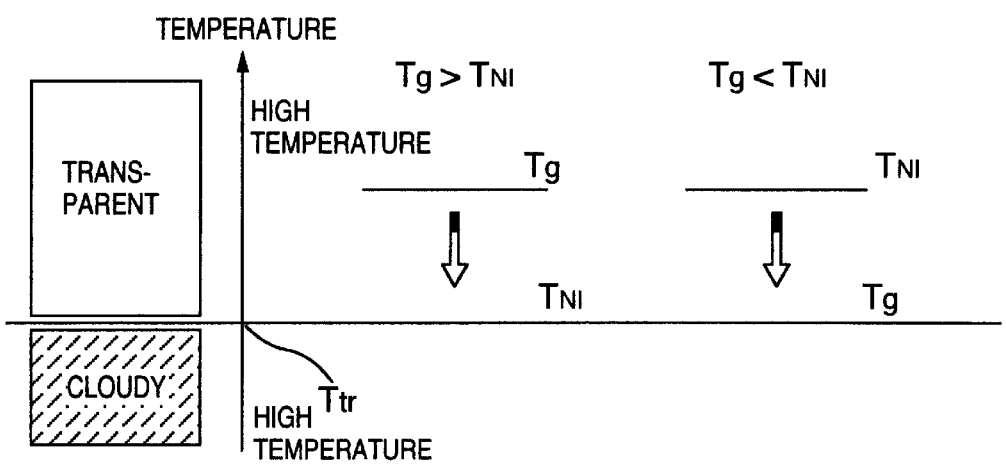
FIG. 5 shows temperature relationships of glass transition point (Tg) of the polymer and phase transition point ($T_{NI}$) of the liquid crystal in the liquid crystal display medium of the present invention, and cloudy state-transparent state changing temperature ($T_{tr}$) as the polymer dispersion type liquid crystal layer.

FIG. 5 shows the relation of temperatures at which the polymer dissolves in the liquid crystal at the time of heating of the polymer dispersion type liquid crystal layer to bring about the optical change of cloudy state-transparent state. The temperature at which the change of cloudy state-transparent state takes place is referred to as $T_{tr}$. It has been found that in the case of $T_g > T_{NI}$, the change of cloudy state-transparent state occurs at a $T_{tr}$ in the vicinity of $T_{NI}$ which is the lower temperature, and in the case of $T_g < T_{NI}$, the change of cloudy state-transparent state occurs at a $T_{tr}$ in the vicinity of $T_g$ which is the lower temperature. Here, when the difference in temperature of $(T_g-T_{NI})$ is great, a wide temperature width is needed for the liquid crystal being dissolved in the polymer by heating, and, as a result, the thermal response tends to become slow. Therefore, it is preferred that the condition $-20°$ C.$\leq(T_g-T_{NI})\leq 20°$ C. is satisfied, and, furthermore, it is more preferred that $0°$ C.$\leq(T_g-T_{NI})\leq 10°$ C. is satisfied. This is because in the case of $-20°$ C.$<(T_g-T_{NI})$, heat distortion of the polymer dispersion type liquid crystal layer is caused due to being repeatedly subjected to heat history and this is not desirable in practical use.

Figure 1B:
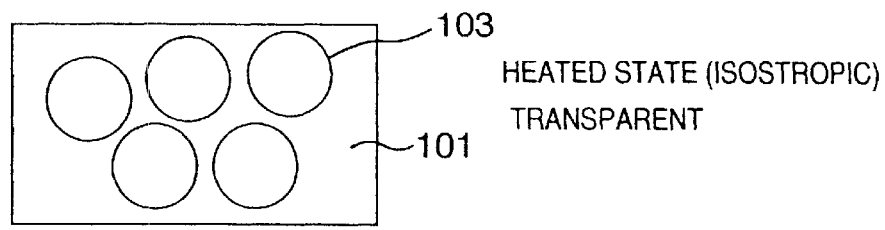
Figure 2:
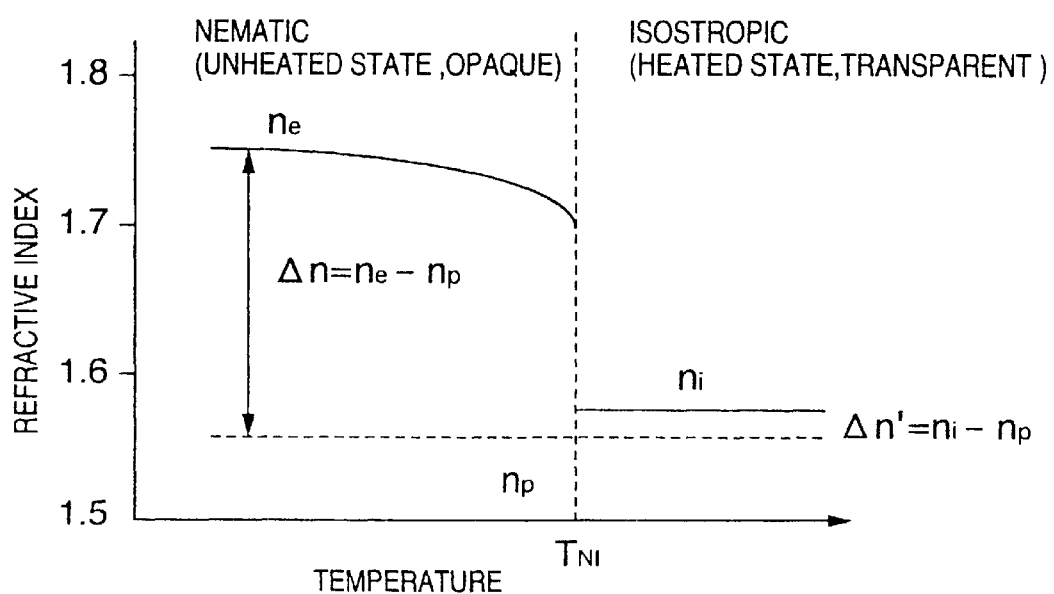
FIG. 2 is a graph which shows the change of refractive index of the polymer dispersion type liquid crystal layer with change of temperature.

Generally, conventional polymer dispersion type liquid crystal displays utilize optical changes caused by carrying out the control on whether the refractive index of the polymer and that of the liquid crystal are close to or not close to each other as shown in FIGS. 1 and 2. Therefore, it is a means for obtaining a highly transparent state to make the refractive index of the liquid crystal for ordinary light close to that of the polymer as completely as possible, and, thus, materials are limited in selection of the refractive indexes of the polymer and the liquid crystal. On the other hand, in the case of the display utilizing thermal heat separation as of the present invention, since there are no limitations in refractive index of materials for obtaining highly transparent state, and, furthermore, $T_{tr}$ is determined by the relation between $T_g$ and $T_{NI}$, optional $T_{tr}$ can be set. Moreover, it has been found that since the thermal phase separation is utilized, transmittance in transparent state does not depend on thickness of the layer, and displays excellent in contrast of high cloudiness and high transparency can be obtained by increasing the thickness of the layer.

Polymers usable in the present invention are highly transparent thermoplastic resins, and preferably acrylic resins. For example, there may be used acrylic resins of high $T_g$ such as polyethyl methacrylate, poly-tert-butyl methacrylate and polyethylene glycol dimethacrylate, alkyd-modified acrylic resins, and acrylic copolymers comprising hard monomers such as styrene, methyl methacrylate, acrylonitrile and acrylamide. $T_g$ of these acrylic polymer resins can be properly set by proper selection of functional groups of the monomers, molecular weight the polymers and copolymeric ratios.

Of course, polymers other than the above acrylic resins can be used in the present invention as far as they can satisfy the relation $-20°$ C.$\leq(T_g-T_{NI})\leq 20°$ C. Examples of these polymer resins are polyvinyl butyral, polyester, polyurethane, vinyl chloride-vinyl acetate copolymer, silicone, polyvinyl alcohol, polyvinyl pyrrolidone, and cyanoethylated materials such as cyanoethylated pullulan. The polymers used in the polymer dispersion type liquid crystals of the present invention can be used each alone or in admixture of two or more as far as the relation $-20°$ C.$\leq(T_g-T_{NI})\leq 20°$ C. can be satisfied.

The liquid crystals used in the polymer dispersion type liquid crystal layer 402 include, for example, nematic liquid crystals of cyanobiphenyl type and cyanoterphenyl type and those mainly composed of these derivatives which have a high index of birefringence: $\Delta n$, taking into consideration heat endurance and ultraviolet aging resistance. Suitable are those having an index of birefringence: $\Delta n$ of preferably 0.20–0.35. If the $\Delta n$ is less than 0.20, cloudiness of the resulting polymer dispersion type liquid crystal film is insufficient, and, on the other hand, practical liquid crystal materials having a $\Delta n$ of more than 0.35 can hardly be produced. Mixtures of these liquid crystal compositions can be adjusted to have a suitable $T_{NI}$ by changing their composition. Therefore, it is also possible to adjust $T_{NI}$ of liquid crystals in conformity with the changing temperature of the polymer dispersion type liquid crystal display devices.

The liquid crystals used in the present invention are not limited to the above-mentioned nematic liquid crystals as far as they have such a thermal responsiveness that they can reversibly change in color or can reversibly change from opaque state to transparent state. For example, as nematic liquid crystals other than cyanobiphenyl type and cyanoterphenyl type, mention may be made of those of cyanopyridine type, Schiff base type, azoxy type, azo type, phenyl benzoate type, biphenyl type having a polar group other than cyano group, terphenyl type having a polar group other than cyano group, phenylcyclohexane type, phenylpyridine type, phenyldioxane type, polycyclic ethane type, phenylcyclohexene type, cyclohexylpyridine type, phenyl type, tolan type and the like. In addition, smectic liquid crystals and cholesteric liquid crystals can also be suitably used.

The liquid crystal display materials which form the polymer dispersion type liquid crystal layer 402 basically comprise a polymer in which the liquid crystal is dispersed in dissolvable or phase-separable state. At high temperatures, the liquid crystal dissolves in the polymer and at low temperatures, the liquid crystal phase-separates from the polymer, and when a reflectance of the liquid crystal display material cooled from the dissolution state at a rate of $10°$ C./sec is referred to as A and a reflectance of the liquid crystal display material cooled from the dissolution state at a rate of $4°$ C./sec is referred to as B, the contrast ratio (B/A) of the liquid crystal display materials of the present invention is not lower than 2 and lower than 16.6. This value is one when a background material 403 having a reflectance of 6% is used in the measurement of reflectance of the display device 400. If the contrast ratio is lower than 2, the contrast in the image forming state is inferior, and identification of the displayed information becomes difficult. Actually, the contrast ratio cannot be 16.6 or higher. The range of the contrast ratio (B/A) is preferably 2–16.0, more preferably 2–13 and further more preferably 2–10.

According to the research conducted by the inventors, it has been found that among the liquid crystals having the same index of birefringence, those of higher viscosity are higher in the contrast ratio. Therefore, in the formation of liquid crystal display materials having the desired contrast ratio, it is preferred to take into consideration the viscosity of the liquid crystals together with the index of birefringence.

With reference to the ratio of the polymer and the liquid crystal used in the polymer dispersion type liquid crystal layer 402 of the present invention, if the amount of the liquid crystal is larger than that of the polymer, there is the problem of bleeding of the liquid crystal and this causes necessity of severe sealing of the polymer dispersion type liquid crystal layer 402, which is unsuitable for simple production process such as coating. On the other hand, if the amount of the liquid crystal is smaller than that of the polymer, film formability is superior, but cloudiness of the polymer dispersion type liquid crystal layer in unheated state decreases. Therefore, the weight ratio of polymer:liquid crystal in the polymer dispersion type liquid crystal layer 402 of the present invention is preferably in the range of 30:70–70:30.

Thickness of the polymer dispersion type liquid crystal layer is not limited, but is preferably in the range of 5–200 $\mu$m. If the thickness is less than 5 $\mu$m, no sufficient display effect can be obtained. On the other hand, if the thickness is more than 200 $\mu$m, the thermal response speed becomes slow to cause difficulty in imaging fast or in obtaining uniform thickness.

The polymer dispersion type liquid crystal layer 402 of the present invention can be formed by coating using solvent evaporation method. Formation of the polymer dispersion type liquid crystal layer by coating makes it possible to carry out coating of large area at a low cost. The method of formation of the polymer dispersion type liquid crystal layer 402 is not limited to the above method, and all of the methods for formation of polymer dispersion type liquid crystal layers which are conventionally employed by one skilled in the art can be used in the present invention. For example, encapsulation method, polymerization phase separation method, thermal phase separation method and others can be optionally selected and used.

For the formation of the polymer dispersion type liquid crystal layer 402 by coating, a mixed solution is prepared using a solvent soluble in both the polymer and the liquid crystal and this mixed solution can be coated on a substrate 401 by conventional coating methods such as blade coating, die coating, roll coating, bar coating, screen printing, brushing, dipping and spraying. As the solvent, there may be used cellosolve, toluene, xylene, cyclohexanone, acetone, methyl ethyl ketone, ethyl acetate, carbon tetrachloride, acetonitrile, pyridine, N,N-dimethylformamide, N,N-dimethylacetamide, N-methyl-2-pyrrolidone, and the like. The solvents can be used each alone or as mixed solvents of two or more.

The substrate 401 supports the polymer dispersion type liquid crystal layer 402 for giving strength, and has no limitation in material and thickness as far as it satisfies transparency, heat resistance and strength in use. For example, a transparent plastic can be used, and this is of low cost and can be made in the form of curved surface due to its flexibility, and thus is suitable in production process of coating. Therefore, plastics are especially preferred in the present invention. Plastics usable in the present invention include, for example, polyethylene terephthalate, polyethylene naphthalate, polyether sulfone, and the like.

Since the liquid crystal display device 400 of FIG. 4 performs the display by carrying out the changing of cloudy state-transparent state of the polymer dispersion type liquid crystal layer 402 by thermal driving, it is preferred to dispose a background layer 403 behind the polymer dispersion type liquid crystal layer 402 for improving the contrast in unheated state and heated state. The background layer suitable for this purpose is, for example, a reflective layer such as of silver, aluminum, tin, nickel, chromium, gold or platinum. These are high in heat conductivity and, hence, are used as a reflective layer of suitable thickness which does not hinder the heat conduction from the heating element 404. In order to improve the contrast of reflectance in cloudy state and that in transparent state, it is more preferred to dispose a black background layer 403 of low reflectance behind the polymer dispersion type liquid crystal layer 402. The background layer is not limited to black one, and by using a colored background layer, displaying of the background color becomes possible.

The heating element 404 shown in FIG. 4 can be any one which can supply rapidly a necessary and sufficient quantity of heat. For example, the heating elements include one which comprises carbon, nickel or the like interposed between electrodes and generates Joule's heat by passing a current through the electrodes; one which comprises nichrome or stainless steel wires which are wired so as to obtain a given resistance and generate Joule's heat; a semi-conductor heat pump such as Peltier element; and heat generation by irradiation with laser beams.

The heating element 404 in FIG. 4 is connected with a temperature controlling device 405. This temperature controlling device 405 has a current supplying device 406 for driving the heating element 404 and, in addition, a temperature sensor 407 for measuring the temperature of the heating element 404. According to the present invention, first, the current supplying device 406 is driven to supply a current to the heating element 404, thereby heating the heating element 404 to a preset temperature to form a transparent state as shown in FIG. 3B. When the temperature sensor 407 detects that the temperature of the heating element 404 reaches the preset temperature, the detection signal is transmitted to controller 408 and is subjected to operation processing in accordance with the temperature controlling programs contained in MPU and CPU (not shown) provided inside the controller 408. The results of the operation are transmitted to the current supplying device 406 as control signals, which control the current value to be supplied from the current supplying device 406 to the heating element 404. By repeating this operation, the temperature of heating element 404 is lowered at a rate which is previously set. When controller 408 receives a command signal externally preset, this drives the current supplying device 406 to supply a current to the heating element 404 and to control the temperature to a constant temperature at which the polymer/liquid crystal composite film becomes transparent, and after lapse of a given period, the temperature lowers in accordance with a given function under control by the controller 408 to maintain the transparent state. The command signal also includes a signal to stop the current supplying device 406 after driving it. Thus, the liquid crystal display device can be returned to the cloudy state (opaque state) from the translucent state through the transparent state. In order to reduce the temperature of the polymer/liquid crystal composite film in dissolution state (transparent state) at a rate of 5° C./sec or higher, if necessary, conventional external cooling devices (not shown) such as a heat sink, a cooling fan and a Peltier element can also be used additionally.

DESCRIPTION OF THE PREFERRED EMBODIMENTS

The present invention will be explained in more detail by the following examples.

EXAMPLE 1

2.5 Grams of polymethyl methacrylate (DELPOWDER 60N manufactured by Asahi Kasei Kogyo K.K.; $T_g$=90° C.) as a polymer and 2 g of a cyanobiphenyl type nematic liquid crystal (E-8 manufactured by Merck & Co., Inc.; $T_{NI}$=72° C., $\Delta$n=0.253, viscosity=35.0 cps (25° C.)) were dissolved in acetone to prepare a 30 wt % solution, and this solution was coated on a PET substrate 401 by an applicator, followed by drying the coat. Thus coated two substrates were laminated by hot pressing so that the polymer dispersion type liquid crystal layers coated on the substrates faced each other, thereby obtaining a polymer dispersion type liquid crystal layer 402 having a thickness of 50 μm. This was combined with a black background material (reflectance 6%) 403 and a heating element 404 comprising a stainless steel heating element to make a liquid crystal display cell A of the present invention.

EXAMPLE 2

2.5 Grams of polymethyl methacrylate (DELPOWDER 60N manufactured by Asahi Kasei Kogyo K.K.; $T_g$=90° C.) as a polymer and 2 g of a cyanobiphenyl type nematic liquid crystal (manufactured by Dainippon Ink & Chemicals Inc.; $T_{NI}$=80° C., $\Delta$n=0.231, viscosity=38.1 cps (25° C.)) were dissolved in acetone to prepare a 30 wt % solution. Using this solution, a liquid crystal display cell B was made in the same manner as in Example 1.

EXAMPLE 3

2.5 Grams of an acrylic resin prepared by partially introducing an amine into polymethyl methacrylate (BZ1161 manufactured by Dainippon Ink & Chemicals Inc.; $T_g=85°$ C.) as a polymer and 2 g of a cyanobiphenyl type nematic liquid crystal (manufactured by Dainippon Ink & Chemicals Inc.; $T_{NI}=80°$ C., $\Delta n=0.231$, viscosity=38.1 cps (25° C.)) were dissolved in toluene to prepare a 30 wt % solution. Using this solution, a liquid crystal display cell C was made in the same manner as in Example 1.

EXAMPLE 4

2.5 Grams of polyvinyl butyral (BL-S manufactured by Sekisui Chemical Co., Ltd.; $T_g=60°$ C.) as a polymer and 2 g of a cyanobiphenyl type nematic liquid crystal (E-8 manufactured by Merck & Co., Inc.; $T_{NI}=72°$ C., $\Delta n=0.253$, viscosity=35.0 cps (25° C.)) were dissolved in methyl ethyl ketone to prepare a 30 wt % solution. Using this solution, a liquid crystal display cell D was made in the same manner as in Example 1.

Using the cell B obtained in Example 2, change of reflectance at each cooling rate when the cell was cooled from the transparent state in heated state was measured. The cooling was carried out by reducing the temperature, at a given rate, to 40° C. from the cloudy state-transparent state changing temperature ($T_{tr}$) of the polymer dispersion type liquid crystal film. The reflectance was measured in the following manner. A black background material (reflectance 6%) and a heating element were disposed behind each cell, the cell was subjected to diffused irradiation from the front side of the cell using an integrating sphere and a halogen light source, and luminance of the surface of the polymer dispersion type liquid crystal cell at the irradiation was measured by a luminance meter (BM-7 manufactured by Topcon Co., Ltd.). The value obtained was normalized using a standard white plate (MgO) to obtain a reflectance. Therefore, when reflectance of each cell was measured, the measured value was never lower than the reflectance of the background material. Moreover, a section of the polymer dispersion type liquid crystal film at each cooling rate was observed by SEM to measure the average particle diameter of the liquid crystal droplets. The results are shown in Table 1.

TABLE 1

| Cooling time from 85° C. to 40° C. (sec) | Cooling rate (° C./sec) | Reflectance (%) | Average particle diameter (μm) |
|---|---|---|---|
| 10 | 4.5 | 40 | 3 |
| 7 | 6.4 | 38 | 1 |
| 4 | 11.3 | 20 | 0.7 |
| 1 | 45.0 | 9 | 0.1 |

As is clear from the results shown in Table 1, in the case of the cell B of Example 2 according to the present invention which satisfied the condition $-20°$ C.$\leq(T_g-T_{NI})\leq 20°$ C., when the liquid crystal which was heated and in the transparent state was rapidly cooled at a rate of not lower than 5° C./sec, the translucent state was maintained. The contrast ratio B/A of the reflectance A of the cell cooled at a rate of 10° C./sec and the reflectance B of the cell cooled at a rate of 4° C./sec not less than 2. This translucent state was maintained even after lapse of 200 hours. After the rapid cooling, the reflectance did not increase. Furthermore, the cloudy state and the translucent state could be reversibly and freely displayed by carrying out re-heating—natural cooling by leaving—re-heating—controlled fast cooling. Moreover, it could be confirmed that by controlling the slow cooling temperature, particle diameter of the liquid crystal droplets could be controlled and optical properties as display devices could be held. Further, the cells A, C and D were subjected to the same tests as conducted for the cell B to obtain the similar results. The results are shown in the following Table 2.

TABLE 2

| Cell No. | Viscosity of liquid crystal (cps) | Reflectance (B) at cooling rate of 10° C./sec (%) | Reflectance (A) at cooling rate of 4° C./sec (%) | Contrast ratio B/A |
|---|---|---|---|---|
| A | 35.0 | 38.0 | 18.0 | 2.1 |
| B | 38.1 | 40.5 | 19.6 | 2.1 |
| C | 35.0 | 41.3 | 16.4 | 2.5 |
| D | 38.1 | 35.1 | 15.1 | 2.3 |

EXAMPLE 5

2.5 Grams of polymethyl methacrylate (DELPOWDER 60N manufactured by Asahi Kasei Kogyo K.K.) as a polymer and 2 g of a cyanobiphenyl type nematic liquid crystal (manufactured by Dainippon Ink & Chemicals Inc.; $\Delta n=0.220$, viscosity=30.6 cps (25° C.)) were dissolved in methyl ethyl ketone to prepare a 30 wt % solution. Using this solution, a liquid crystal display cell E was made in the same manner as in Example 1.

EXAMPLE 6

To 1 g of a cyanobiphenyl type nematic liquid crystal (manufactured by Dainippon Ink & Chemicals Inc.; $\Delta n=0.220$, viscosity=30.6 cps (25° C.)) as a liquid crystal was added 1 g of 4-pentyloxy-4-biphenylcarbonitrile (manufactured by Aldrich Co., Ltd.) for the purpose of increasing the viscosity of said liquid crystal to obtain 2 g of a nematic liquid crystal. This nematic liquid crystal had $\Delta n=0.2134$ and viscosity=44.6 cps (25° C.). 2 Grams of this nematic liquid crystal and 2.5 g of polymethyl methacrylate (DELPOWDER 60N manufactured by Asahi Kasei Kogyo K.K.) were dissolved in methyl ethyl ketone to prepare a 30 wt % solution. Using this solution, a liquid crystal display cell F was made in the same manner as in Example 1.

EXAMPLE 7

2.5 Grams of polymethyl methacrylate (DELPOWDER 60N manufactured by Asahi Kasei Kogyo K.K.) as a polymer and 2 g of a cyanopyridine type nematic liquid crystal (manufactured by Dainippon Ink & Chemicals Inc.; $\Delta n=0.253$, viscosity=51.0 cps (25° C.)) were dissolved in methyl ethyl ketone to prepare a 30 wt % solution. Using this solution, a liquid crystal display cell G was made in the same manner as in Example 1.

The liquid crystal display cells obtained in Examples 5–7 were subjected to measurement of reflectance A' when cooled at a rate of 45° C./sec from the dissolution state and reflectance B' when cooled at a rate of 2° C./sec from the dissolution state, and the contrast ratio B'/A' was obtained.

The measurement of the reflectance was conducted by the same method as mentioned above. The results are shown in the following Table 3.

TABLE 3

| Cell No. | Viscosity of liquid crystal (cps) | Reflectance (B') at cooling rate of 45° C./sec (%) | Reflectance (A') at cooling rate of 2° C./sec (%) | Contrast ratio B/A |
|---|---|---|---|---|
| E | 30.6 | 41.2 | 12.5 | 3.3 |
| F | 44.6 | 39.2 | 8.7 | 4.5 |
| G | 51.0 | 34.7 | 6.4 | 5.4 |

It can be seen from the results shown in Table 2 that the contrast ratio was improved by increasing the viscosity of the liquid crystal. Furthermore, in the cell G (Example 7), a contrast ratio of 5.4 was obtained when liquid crystal of high viscosity and high index of birefringence was used.

As explained above, according to the present invention, liquid crystal display materials having high contrast are obtained. Furthermore, in liquid crystal display devices using a polymer and a liquid crystal in which glass transition point ($T_g$) of the polymer and phase transition point ($T_{NI}$) satisfy the requirement of $-2° C. \leq (T_g - T_{NI}) \leq 20° C.$, the cooling rate from the dissolution state is controlled to make fine the size of liquid crystal droplets, thereby forming a translucent state and the image forming state at the time of dissolution can be maintained.

What is claimed is:

1. A liquid crystal display material comprising:
   a polymer; and
   a liquid crystal,
   wherein the liquid crystal is in a dissolved state in the polymer at high temperatures and separates from the polymer at low temperatures, and a contrast ratio (B/A) of a reflectance (A) of the display material cooled from the dissolved state at a rate of 10° C./sec and a reflectance (B) of the display material cooled from the dissolved state at a rate of 4° C./sec is not less than 2.

2. A liquid crystal display material according to claim 1, wherein the average particle diameter of the liquid crystal dispersed in the polymer when the material is cooled from the dissolved state at a rate of not lower than 5° C./sec is less than 1 μm.

3. A liquid crystal display material according to claim 1, wherein the phase transition temperature ($T_{NI}$) of anisotropic phase-isotropic phase of the liquid crystal and the glass transition temperature ($T_g$) of the polymer satisfy the formula: $-20° C. \leq (T_g - T_{NI}) \leq 20° C.$ 4. A liquid crystal display material according to claim 1, wherein the liquid crystal comprises a cyanobiphenyl and cyanoterphenyl type nematic liquid crystal having an index of birefringence of 0.20–0.35 as a main component.

5. A liquid crystal display method, which comprises:
   providing a liquid crystal display medium comprising a polymer/liquid crystal composite film in which the liquid crystal is in a dissolved state in the polymer at a temperature not lower than a display changing temperature, and the polymer and the liquid crystal undergo reversible thermal phase separation at a lower temperature than the display changing temperature; and
   controlling a cooling rate from the dissolved state to maintain the polymer/liquid crystal composite film in a translucent state, thereby maintaining display information.

6. A liquid crystal display method according to claim 5, wherein the temperature is lowered from the dissolved state at a rate of not lower than 5° C./sec.

7. A liquid crystal display method according to claim 5, wherein the average particle diameter of the liquid crystal dispersed in the matrix of the polymer when the cooling rate from the dissolved state is controlled to maintain the liquid crystal in the translucent state is less than 1 μm.

8. A liquid crystal display method according to claim 5, wherein a polymer whose glass transition temperature ($T_g$) and a liquid crystal whose phase transition temperature ($T_{NI}$) of anisotropic phase-isotropic phase satisfy the formula: $-20° C. \leq (T_g - T_{NI}) \leq 20° C.$ are used in the liquid crystal display medium.

9. A liquid crystal display method according to claim 5, wherein the liquid crystal in the liquid crystal display medium comprises a cyanobiphenyl and cyanoterphenyl type nematic liquid crystal having an index of birefringence of 0.20–0.35 as a main component.

* * * * *